(12) United States Patent
Qiu et al.

(10) Patent No.: US 9,399,580 B2
(45) Date of Patent: Jul. 26, 2016

(54) GRANULES OF GRAPHENE OXIDE BY SPRAY DRYING

(71) Applicant: THE TRUSTEES OF THE STEVENS INSTITUTE OF TECHNOLOGY, Hoboken, NJ (US)

(72) Inventors: Hongwei Qiu, Harrison, NJ (US); Thomas A. Bechtold, Morristown, NJ (US); Lihn Tung Le, New York, NY (US); Woo Young Lee, Ridgewood, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 0 days.

(21) Appl. No.: 14/865,844

(22) Filed: Sep. 25, 2015

(65) Prior Publication Data

US 2016/0016802 A1    Jan. 21, 2016

Related U.S. Application Data

(62) Division of application No. 14/156,070, filed on Jan. 15, 2014.

(60) Provisional application No. 61/754,223, filed on Jan. 18, 2013.

(51) Int. Cl.
  *C01B 31/04* (2006.01)
  *H01G 11/36* (2013.01)

(52) U.S. Cl.
  CPC .......... *C01B 31/0446* (2013.01); *C01B 31/043* (2013.01); *H01G 11/36* (2013.01); *Y02E 60/13* (2013.01); *Y10T 428/2982* (2015.01)

(58) Field of Classification Search
  None
  See application file for complete search history.

(56) References Cited

U.S. PATENT DOCUMENTS

| 4,772,924 A | 9/1988 | Bean et al. |
| 4,903,101 A | 2/1990 | Maserjian |

(Continued)

FOREIGN PATENT DOCUMENTS

| WO | 2012073998 A1 | 6/2013 |
| WO | 2013119295 | 8/2013 |

OTHER PUBLICATIONS

Bechtold, Tom et al, "Supercapacitor Electrodes from Spray Dried Graphene Granules", Stevens Institute of Technology, Stevens Summer Scholars Program 2012, 1 page.*

(Continued)

*Primary Examiner* — Mary F Theisen
(74) *Attorney, Agent, or Firm* — Greenberg Traurig, LLP

(57) ABSTRACT

Granules of graphene oxide may be produced from a dispersion of nanoscale graphene oxide sheets by a spray drying method. Such granules have a three-dimensional corrugated morphology. The complexity of the corrugations, and the size distribution of the granules can be varied through selection of the spray-drying equipment used, and variation of the composition of the dispersion and the spray-drying parameters. Structural modifiers may be included in the graphene oxide dispersion to control the ultimate morphology of the granules. The granules of graphene oxide may be thermally reduced at a moderate temperature of 220° C. to increase the granules' electrical conductivity. The reduced granules may be used to fabricate electrodes for supercapacitors. The power and energy density of such an electrode material is comparable to those of conventional/commercial activated carbon-based electrodes.

4 Claims, 4 Drawing Sheets

(56) References Cited

U.S. PATENT DOCUMENTS

| | | | |
|---|---|---|---|
| 5,238,868 A | 8/1993 | Elman et al. |
| 6,813,064 B2 | 11/2004 | John et al. |
| 7,167,355 B2 | 1/2007 | Chen |
| 7,217,951 B2 | 5/2007 | Krishna et al. |
| 7,387,253 B1 | 6/2008 | Parker et al. |
| 7,550,755 B2 | 6/2009 | Balkenende et al. |
| 7,628,928 B2 | 12/2009 | Guerra |
| 7,830,926 B1 | 11/2010 | Kim |
| 7,852,613 B2 | 12/2010 | Ma et al. |
| 8,098,482 B2 | 1/2012 | Clelland et al. |
| 8,206,469 B2 | 6/2012 | Chiang et al. |
| 8,278,757 B2 | 10/2012 | Crain |
| 8,455,842 B2 | 6/2013 | Zhang |
| 8,697,485 B2 | 4/2014 | Crain |
| 8,810,996 B2 | 8/2014 | Lee et al. |
| 8,878,120 B2 | 11/2014 | Patil et al. |
| 9,025,316 B2 | 5/2015 | Lee et al. |
| 2003/0012249 A1 | 1/2003 | Eisenbeiser |
| 2007/0215855 A1 | 9/2007 | Kang |
| 2010/0207254 A1 | 8/2010 | Jain et al. |
| 2011/0042813 A1 | 2/2011 | Crain |
| 2011/0052813 A1 | 3/2011 | Ho |
| 2011/0101309 A1 | 5/2011 | Lin et al. |
| 2011/0256014 A1 | 10/2011 | Hong et al. |
| 2012/0007913 A1 | 1/2012 | Jang |
| 2012/0121891 A1 | 5/2012 | Kim |
| 2012/0128983 A1 | 5/2012 | Yoon |
| 2012/0170171 A1 | 7/2012 | Lee |
| 2012/0235119 A1 | 9/2012 | Babich et al. |
| 2012/0244358 A1 | 9/2012 | Lock |
| 2012/0255860 A1 | 10/2012 | Briman et al. |
| 2012/0270205 A1 | 10/2012 | Patel |
| 2013/0264011 A1 | 10/2013 | Lin |
| 2013/0264192 A1 | 10/2013 | Lin |
| 2013/0264193 A1 | 10/2013 | Lin |
| 2013/0264307 A1 | 10/2013 | Lin |
| 2013/0266729 A1 | 10/2013 | Lin |
| 2014/0103298 A1 | 4/2014 | Lee |
| 2014/0127584 A1 | 5/2014 | Kim et al. |
| 2014/0205841 A1 | 7/2014 | Qiu et al. |
| 2014/0231002 A1 | 8/2014 | Patil et al. |
| 2014/0321028 A1 | 10/2014 | Lee et al. |
| 2014/0334065 A1 | 11/2014 | Lee et al. |

OTHER PUBLICATIONS

Akhavan, O. et al., Toxicity of graphene and graphene oxide nanowalls against bacteria, ACS Nano, 4 (2010) 5731-5736.

Bolotin, K. et al., Ultrahigh electron mobility in suspended graphene; Solid State Communications, 146 (2008) 351-355.

Bourlinos, A. et al., Graphite oxide: Chemical reduction to graphite and surface modification with primary aliphatic amines and amino acids, Langmuir, 19 (2003) 6050-6055.

Chen, Z. et al., Three-dimensional flexible and conductive interconnected graphene networks grown by chemical vapour deposition, Nature Materials, 10 (2011) 424-428.

Coleman, J.N., Liquid-Phase Exfoliation of Nanotubes and Graphene, Advanced Functional Materials, 19 (2009) 3680-3695.

Cote, L. et al., Flash Reduction and Patterning of Graphite Oxide and Its Polymer Composite, Journal of the American Chemical Society, 131 (2009) 11027-11032.

Dikin, D. et al., Preparation and characterization of graphene oxide paper, Nature, 448 (2007) 457-460.

Dreyer, D. et al., The chemistry of graphene oxide, Chemical Society reviews, 39 (2010) 228-240.

Dreyer, D. et al., From Conception to Realization: An Historical Account of Graphene and Some Perspectives for Its Future, Angewandte Chemie International Edition, 49 (2010) 9336-9344.

El-Kady, M. et al., "Laser Scribing of High-Performance and Flexible Graphene-Based Electrochemical Capacitors," Science, vol. 335, No. 6074, pp. 1326-1330, Mar. 2012.

Gao, X. et al., Hydrazine and thermal reduction of graphene oxide: Reaction mechanisms, product structures, and reaction design, Journal of Physical Chemistry C, 114 (2010) 832-842.

Hong, A. et al., "Graphene Flash Memory," ACS Nano 5 (10), 7812-7817 (2011).

Ferrari, A. et al., Inkjet-Printed Graphene Electronics; ACS Nano, vol. 6, No. 4, 2992-3006, (2012).

Kim, F. et al., Graphene oxide: Surface activity and two-dimensional assembly, Advanced Materials, 22 (2010) 1954-1958.

Kim, J. et al., Graphene oxide sheets at interfaces, Journal of the American Chemical Society, 132 (2010) 8180-8186.

Kong, D. et al., Temperature-Dependent Electrical Properties of Graphene Inkjet-Printed on Flexible Materials, Langmuir, ACS Publications, American Chemical Society, 28, (2012) pp. 13467-13472.

Lee, Y. et al., "Wafer-Scale Synthesis and Transfer of Graphene Films," Nano Letters 10 (2), 490-493 (2010).

Li, D. et al., Processable aqueous dispersions of graphene nanosheets, Nat Nano, 3 (2008) 101-105.

Li, X. et al., Large-Area Synthesis of High-Quality and Uniform Graphene Films on Copper Foils, Science, 324 (2009) 1312-1314.

Lin, Y. et al., "100-GHz Transistors from Wafer-Scale Epitaxial Graphene," Science, 327 (2010) p. 662.

Lin, Y. et al., "Wafer-Scale Graphene Integrated Circuit," Science 332 (6035), 1294-1297 (2011).

Luo, J. et al., Compression and Aggregation-Resistant Particles of Crumpled Soft Sheets, ACS Nano, 5 (2011) 8943-8949.

Luo, J. et al., Graphene oxide nanocolloids, Journal of the American Chemical Society, 132 (2010) pp. 17667-17669.

Novoselov, K. et al., Electric Field Effect in Atomically Thin Carbon Films, Science, 306 (2004) pp. 666-669.

Park, J. et al., Multi-scale graphene patterns on arbitrary substrates via laser-assisted transfer-printing process, Applied Physics Letters, vol. 101, No. 4, (2012) p. 043110-043110-4.

Park, S. et al., Chemical methods for the production of graphenes, Nat Nano, 4 (2009) 217-224.

Shao, G. et al., Graphene oxide: The mechanisms of oxidation and exfoliation, Journal of Materials Science, 47 (2012) 4400-4409.

Stankovich, S. et al., Synthesis of graphene-based nanosheets via chemical reduction of exfoliated graphite oxide, Carbon, 45 (2007) 1558-1565.

Stoller, M. et al., Graphene-Based ultracapacitors; Nano Letters, 8 (2008) 3498-3502.

Torrisi, F. et al., Inkjet-Printed Graphene Electronics, ACS NANO, vol. 6, No. 4, (2012) 2992-3006.

Wu, Z.S. et al., Graphene/metal oxide composite electrode materials for energy storage, Nano Energy, 1 (2012) 107-131.

Zangmeister, C.D., Preparation and evaluation of graphite oxide reduced at 220 c, Chemistry of Materials, 22 (2010) 5625-5629.

Zhang, Y. et al., Cytotoxicity effects of graphene and single-wall carbon nanotubes in neural phaeochromocytoma-derived pc12 cells, ACS Nano, 4 (2010) 3181-3186.

Zhang, Y. et al., "Direct imprinting of microcircuits on graphene oxides film by femtosecond laser reduction," Nano Today, vol. 5, (2010) pp. 15-20.

Zhu, Y. et al., Carbon-Based Supercapacitors Produced by Activation of Graphene; Science, 332 (2011) 1537-1541.

Havener, R. et al., Hyperspectral Imaging of Structure and composition in Atomically Thin Heterostructures; ACS Nano, 13 (2013) 3942-3946.

Ko, S. et al., Unconventional, Laser Based OLED Material Direct Patterning and Transfer Method; Organic Light Emitting Diode—Material, Process and Devices; Intech, ISBN: 978-953-307-273-9.

Lee, K. et al., Effect of Laser Beam Trajectory on Donor Plate in Laser Induced Thermal Printing Process; Journal of the Optical Society of Korea, vol. 15, No. 4, Dec. 2011, pp. 362-367.

Cho, S. et al., Enhanced efficiency of organic light emitting devices (OLEDs) by control of laser imaging condition; Organic Electronics 13 (2012) 833-839.

Olivares-Marín, M. et al., Cherry stones as precursor of activated carbons for supercapacitors; Materials Chemistry and Physics 114, 1, (2009) 223-227.

(56) References Cited

OTHER PUBLICATIONS

An, L. et al., Optical and Sensing Properties of 1-Pyrenecarboxylic Acid-Functionalized Graphene Films Laminated on Polydimethylsiloxane Membrane, American Chemical Society, vol. 5, No. 2, (2011), pp. 1003-1011.

Le, L. et al., Graphene supercapacitor electrodes fabricated by inkjet printing and thermal reduction of graphene oxide, Electrochemistry Communications, vol. 13, (2011), pp. 355-358.

Le, L. et al., Inkjet-Printed Graphene for Flexible Micro-Supercapacitors, IEEE International Conference on Nanotechnology, Aug. 15-18, 2011, Portland, Oregon, USA, pp. 67-71.

Huang, L. et al., Graphene-Based Conducting Inks for Direct Inkjet Printing of Flexible Conductive Patterns and Their Applications in Electric Circuits and Chemical Sensors, Nano Res, (2011) 9 pages.

Jacoby, M., Graphene Moves Toward Applications, www.cen-online.org, Nov. 21, 2011, pp. 10-15.

Jang, B.Z. et al., Processing of nanographene platelets (NGPs) and NGP nanocomposites: a review; Journal of Materials Science 43, 5092-5101, (2008).

Jang, B.Z. et al., Graphene-Based Supercapacitor with an Ultrahigh Energy Density; NanoLetters, 10, 4863-4868, (2010).

Zhou et al.; Controlled Synthesis of Large-Area and Patterned Electrochemically Reduced Graphene Oxide Films, Chem. Eur. J., 2009, 15, pp. 6116-6120.

Non-Final Office Action Mailed Aug. 15, 2014 in reference to U.S. Appl. No. 14/327,716.

Non-Final Office Action mailed Dec. 6, 2013 in reference to U.S. Appl. No. 13/301,124.

Final Office Action mailed Jun. 25, 2014 in reference to U.S. Appl. No. 13/324,622.

First Action Interview Program Communication mailed Nov. 6, 2014 regarding U.S. Appl. No. 14/053,232.

First Action Interview Pilot Program Pre-Interview Communication mailed Jul. 9, 2015 in reference to U.S. Appl. No. 14/156,070.

\* cited by examiner

GRANULES OF GRAPHENE OXIDE BY SPRAY DRYING

CROSS-REFERENCE TO RELATED APPLICATIONS

The present application is a divisional application of U.S. patent application Ser. No. 14/156,070, filed Jan. 15, 2014, and claims the benefit of U.S. Provisional Patent Application No. 61/754,223, filed on Jan. 18, 2013, the disclosures of which are incorporated by reference herein.

FIELD OF THE INVENTION

The present invention relates to granules of graphene oxide and methods of making same, and, more specifically, to granules of graphene oxide useful for fabricating electrical components.

BACKGROUND OF THE INVENTION

Graphene has recently received significant attention due to its many attractive properties, including: chemical and electrochemical stability; electrical conductivity; and high theoretical surface area (e.g., 2630 $m^2/g$). This theoretical surface area compares well to those of: carbon nanotubes (CNT) (e.g., 1315 $m^2/g$); and commercially available activated carbon (typically, 500 $m^2/g$). A common method of producing CNT is chemical vapor deposition (CVD), which has remained quite expensive despite several decades of research and development. In contrast, graphene can be prepared by a number of diverse routes, ranging from CVD to mechanical cleaving of graphite. In particular, thermochemical exfoliation of graphite powder has rapidly become a cost-effective method for large-scale production of graphene and graphene oxide nanosheets. With this method, the price of graphene and graphene oxide sheets is projected to be $50/kg over next several years. This projected price is comparable to that of electronic grades of activated carbon.

Graphene oxide nanosheets may be regarded as being graphene nanosheets with various functional groups, such as carboxylic acid and phenolic hydroxyl groups, attached to the edges or basal plane. Graphene oxide can be reduced to graphene. Aqueous dispersions of graphene oxide nanosheets are colloidally stable, a state generally attributed to electrostatic interactions resulting from the ionization of these functional groups. Due to the presence of oxidized functional groups, graphene oxide nanosheets are surface active. Graphene oxide can be easily reduced by thermal reduction, chemical reduction, or flash reduction to obtain reduced graphene oxide, a material that is comparable to graphene.

In the majority of current research and practical applications, the processing of graphene oxide nanosheets is based on filtration of graphene oxide dispersion through a membrane filter. Concerns raised by such filtration-based methods include:

(1) stacking of graphene oxide nanosheets due to van der Waals force, which renders a portion of the surface area inaccessible, thereby adversely affecting the electrochemical or electrical properties (e.g., capacitance) of the graphene oxide devices;

(2) re-stacking of graphene oxide nanosheets during application, such as, for example, in supercapacitors where irreversible loss of capacity during cycling occurs, and is likely due to re-stacking of nanosheets during charging and discharging operation; and (3) environmental, safety and health (ESH) concerns associated with both the processing and the application of graphene oxide, since the material is cytotoxic in its nanoscale form.

SUMMARY OF THE INVENTION

In an embodiment of the present invention, granules comprising graphene nanosheets have a corrugated morphology with substantially greater surface area and longer ion pathways than non-corrugated granules of comparable size. In some embodiments, the granules include a structural modifier that modifies the morphology of the granules, and increases the degree and complexity of the corrugations. In some embodiments, the granules include reduced graphene oxide. In some embodiments, the granules are primarily reduced graphene oxide. In some embodiments, the granules are components of electrodes for capacitors.

In an embodiment of a method of the present invention, an aqueous dispersion of graphene oxide nanosheets is spray-dried to form granules of graphene oxide. In some embodiments, the aqueous suspension also includes structural modifiers that modify the morphology of the granules. In some embodiments, the structural modifier is a salt having volatile components (e.g., ammonium bicarbonate). In some embodiments, the graphene oxide granules are reduced so as to modify their electrical properties. In some embodiments, the reduced graphene oxide granules are combined with a binder to form an electrode.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Figure 1:
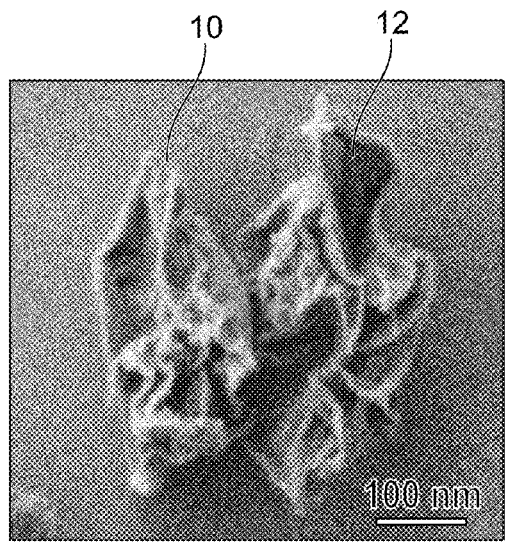
FIG. 1 is a scanning electron microscopy image of granules of graphene oxide prepared without a structural modifier according to a method of the present invention.

The present invention includes a method of making granules of graphene oxide having a three-dimensional corrugated morphology, which includes a step of spray drying a graphene oxide dispersion. In some embodiments of the invention, a suitable graphene oxide dispersion is prepared by dispersing graphite oxide solid into a solvent under ultrasonic conditions to form a stable dispersion of single molecular layers of graphene oxide. In some embodiments of the invention, the nanosheets of graphene oxide have a thickness of one to a few molecular layers and lateral dimensions of about 100 nm to about 1000 nm (1 μm). In other embodiments of the present invention, graphene oxide dispersions prepared by other means, or having graphene oxide sheets with other thicknesses or other nanoscale or microscale lateral dimensions may be used.

In an embodiment of a method of the present invention, a graphene oxide dispersion is spray dried using, for example, a commercial spray dryer to produce graphene oxide granules having dimensions in the range of about 1 μm to about 20 μm. In some embodiments of the invention, spray-dried granules of graphene oxide have a three-dimensional corrugated morphology. In some embodiments of the invention, the three-dimensional corrugated morphology of the granules is tailored by adjusting the parameters of the spray drying process, the method and conditions for atomizing the graphene oxide dispersion, or by including a structural modifier. For the purpose of the present disclosure, a structural modifier is a physical or chemical additive to the graphene oxide solution which affects the morphology of the granules produced during the spray drying process.

In an embodiment of the present invention, the graphene oxide granules are thermally reduced at moderate temperatures (e.g., a temperature of about 220° C.) in an inert environment or in air to increase the electrical conductivity of the granules. In an embodiment of the present invention, the granules are used in electrical components (e.g., supercapacitors). The power and energy density of electrodes fabricated from thermally-reduced granules of graphene oxide may be comparable to those of activated carbon-based electrodes prepared using commercially-available activated carbon. Embodiments of the present invention provide an effective, robust, scalable, and safe method for processing graphene oxide into a form (i.e., corrugated granules) which not only retains the nanoscale properties of graphene oxide nanosheets, but which also presents minimal ESH issues compared to graphene nanotechnologies in the prior art.

In an embodiment of the present invention, granules of graphene oxide are prepared from a graphene oxide dispersion using a spray dryer (e.g., BUCHI Mini Spray Dryer B-290, BUCHI Corporation, New Castle, Del.). A suitable graphene oxide may be prepared from a commercially-available source, or prepared using known techniques. In an embodiment of the invention, solid graphene oxide, synthesized using a modified Hummers method, is obtained from a commercial source (e.g., Cheap Tubes, Inc., Brattleboro, Vt.). To prepare the dispersion of graphene oxide nanosheets, the graphite oxide solid is dispersed in de-ionized water using a pulsed ultrasonic probe. The dispersed graphene oxide nanosheets are typically single-layered or a few layers thick and have micron or sub-micron lateral dimensions in the range of about 100 nm to about 1000 nm. The graphene oxide nanosheet dispersions are colloidally stable at various concentrations. An exemplary graphene oxide dispersion, prepared at a concentration of 5 mg/ml by the aforesaid method, was found to be stable for months, mostly likely due to the presence of various oxidized functional groups (e.g., carboxylic acid and phenolic hydroxyl groups) formed at the edges or basal plane of the nanosheets by the strong oxidants used to synthesize the graphene oxide.

In the following exemplary embodiments, granules of graphene oxide were produced from a graphene oxide dispersion (5 mg/ml) by spray drying (i.e., atomizing the dispersion to produce droplets, and drying the droplets in a gas stream).

Figure 2:
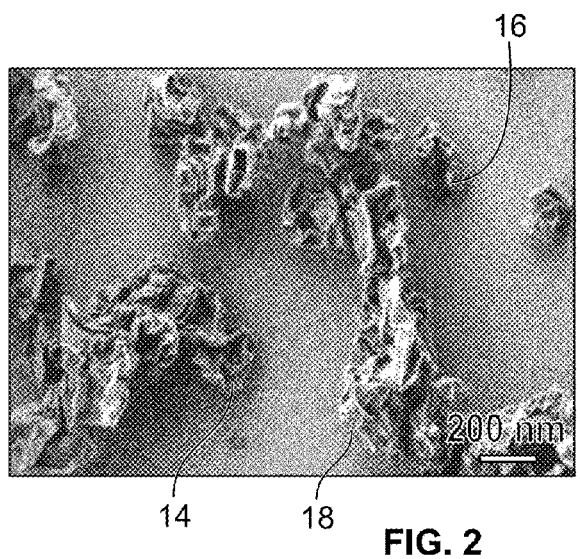
FIG. 2 is a second scanning electron microscopy image of granules of graphene oxide prepared without a structural modifier according to a method of the present invention.

The droplets were produced using a pneumatic nozzle having a diameter of about 1 mm at a gas pressure of 50 psi and a graphene oxide dispersion feeding rate of 2.74 mL/min. The droplets produced had a size distribution in the range of about 10 μm to about 100 μm. The droplets were dried inside the spray dryer, forming granules of graphene oxide from the dispersed graphene oxide sheets. The inlet temperature of the spray dryer was higher than the boiling temperature of water (e.g., about 120° C.). The aspirator in the spray dryer was set at 100%. Air was used as the drying gas, but other gas or gas mixtures may be used. The granules of graphene oxide were separated from the gas flow by a cyclone separator, and collected in an electrically-grounded container. FIGS. 1 and 2 present examples of graphene oxide granules produced by the aforesaid method. The granules generally have dimensions in the range of about 1 μm to about 2 μm. The granules have a corrugated three-dimensional morphology. A typical surface area of a granule formed by the foregoing process was about 394 $m^2/g$ as measured by BET analysis.

The three-dimensional morphology of graphene oxide granules (e.g., graphene oxide granules 10, 12, 14, 16, 18) prepared by the method of the present invention can be varied by adjusting the parameters of the spray-drying process. Parameters which may be varied include, but are not limited to: the type of atomizer and conditions of atomization; the conditions of the spray drying step, such as inlet temperature and the feed rate of the graphene oxide dispersion and/or the drying gas; and the use of structural modifiers in the graphene oxide dispersion to modify the three-dimensional morphology of the granules. Structural modifiers for controlling the morphology of the graphene oxide granules may include salts having volatile or non-volatile components, nanoparticles of various substances, and carbon nanotubes. Such structural modifiers, as well as others, modify the nanoscale structure of the granules.

Figure 3:
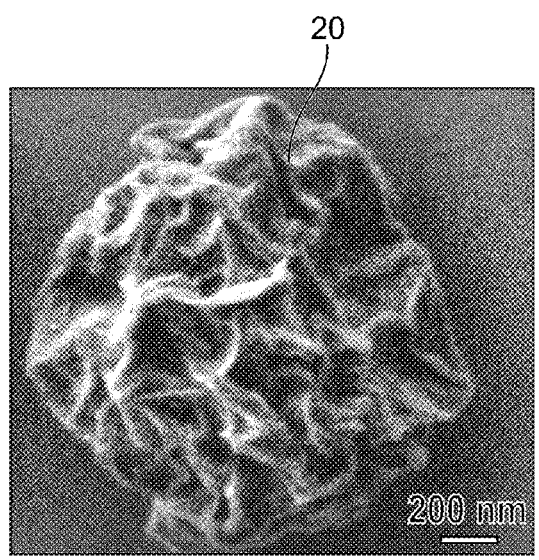
FIG. 3 is a third scanning electron microscopy image of granules of graphene oxide prepared with a structural modifier according to a method of the present invention.
Figure 4:
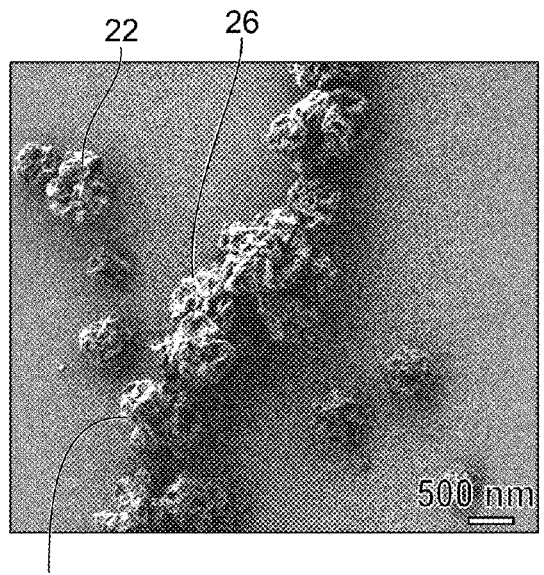
FIG. 4 is a fourth scanning electron microscopy image of granules of graphene oxide prepared with a structural modifier according to a method of the present invention.

In an exemplary embodiment of the present invention, ammonium bicarbonate ($NH_4HCO_3$) was added to the graphene oxide dispersion to serve as a structural modifier during the spray drying. Dissolving a high concentration (5 mg/ml) of $NH_4HCO_3$ into the graphene oxide dispersion did not noticeably affect the stability of the dispersion. A graphene oxide dispersion with $NH_4HCO_3$, having both components at concentrations of 5 mg/ml, was spray dried under the conditions previously described. FIGS. 3 and 4 show that the resulting granules (e.g., granules 20, 22, 24, 26) are more highly corrugated than the granules of FIGS. 1 and 2, which were produced without $NH_4HCO_3$. Due to the low decomposition temperature of $NH_4HCO_3$, the structural modifier decomposes during the spray drying process and does not contaminate the granules of graphene oxide.

The graphene oxide granules having corrugated three-dimensional morphologies have various potential applications, which include, but are not limited to, energy storage, water desalination, catalysis, sorption of oil or solvents, or as additives to polymeric or ceramic materials. Such granules have also been demonstrated to have applications as an electrode material of supercapacitors for energy storage. A complex corrugation provides a greater surface area to the granules, as well as long ion pathways which, for capacitors, provide a high current density.

To demonstrate the electrical properties of the graphene oxide granules of the present invention, granules prepared without a structural modifier were reduced at 220° C. under a helium atmosphere for 12 hours. The color of the granules changed to black after the reduction, suggesting the transformation of graphene oxide to graphene. After reduction, the granules have similar morphologies to those of the spray-dried granules before reduction. The reduced granules of graphene oxide were then mixed with a polytetrafluoroethylene (PTFE) aqueous dispersion (10 wt %) and pressed at a pressure of 10 MPa to the surface of a titanium (Ti) foil having a thickness of 100 μm. Titanium was selected as the current collector due to its compatibility with the chosen sulfuric acid ($H_2SO_4$) electrolyte. PTFE served as a binder for the granules, at a concentration of about 5 wt % relative to the weight of the granules. Two such electrodes were prepared and soaked in 1M $H_2SO_4$ electrolyte. The electrodes were then inserted into a polyethylene-based pouch using a Celgard 3401 membrane (Celgard, LLC, Charlotte, N.C.) as a separator to form a capacitor. The packaged capacitor was clamped for cyclic voltammetry and constant current charge/discharge measurements using a multifunction MACCOR Model 4304 desktop automated test system (MACCOR, Inc., Tulsa, Okla.).

Figure 5:
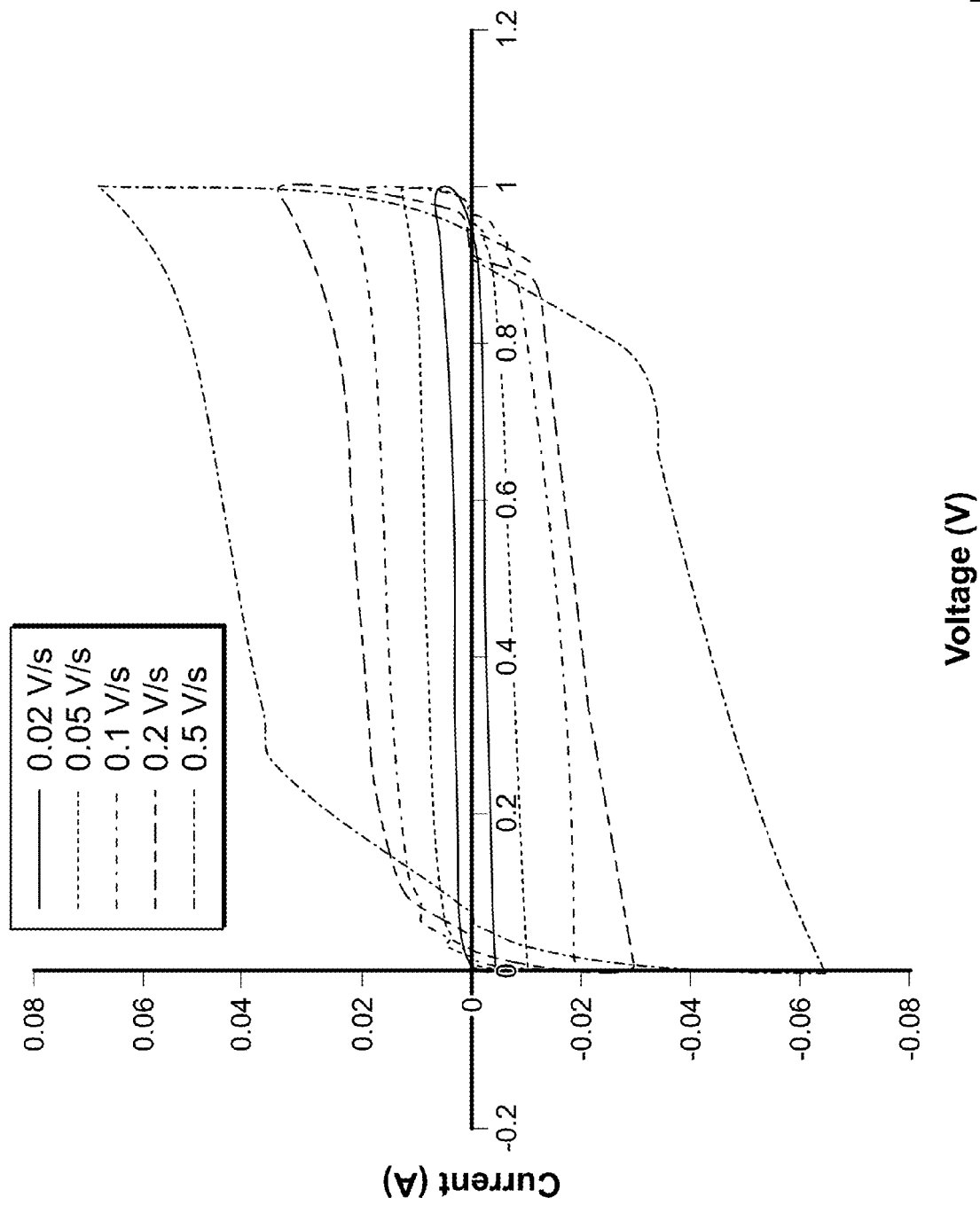
FIG. 5 is a graph of the cyclic voltammetry response of an electrode prepared from thermally reduced granules of graphene oxide according to an embodiment of the present invention.

FIG. 5 is a cyclic voltammetry (CV) plot of the capacitor at different voltage scan rates, varied from 0.02 V/s to 0.5 V/s. CV is a standardized electrochemical characterization test for supercapacitor electrodes. The reduced graphene oxide granule-based capacitor exhibited fairly rectangular CV curves characteristic of a pure double-layer capacitance device. The specific capacitance of the capacitor ranged from about 40 F/g to about 78 F/g with respect to the reduction of the scan rate from 0.5 V/s to 0.02 V/s, respectively. The specific capacitance of 78 F/g compared favorably with the gravimetrical capacitance of 72 F/g of activated carbon powder (Norit DLC-30, Cabot Corporation, Boston, Mass.). The activated carbon powder capacitor was tested as a control material prepared in the same manner as described above, but using activated carbon powder in place of the reduced spray-dried granules of the present invention. Moreover, the measured capacitances of the granule-based capacitor were of the same order of magnitude as other graphene-based capacitor prepared by conventional powder-based methods without any pseudo-capacitive contributions.

Figure 6:
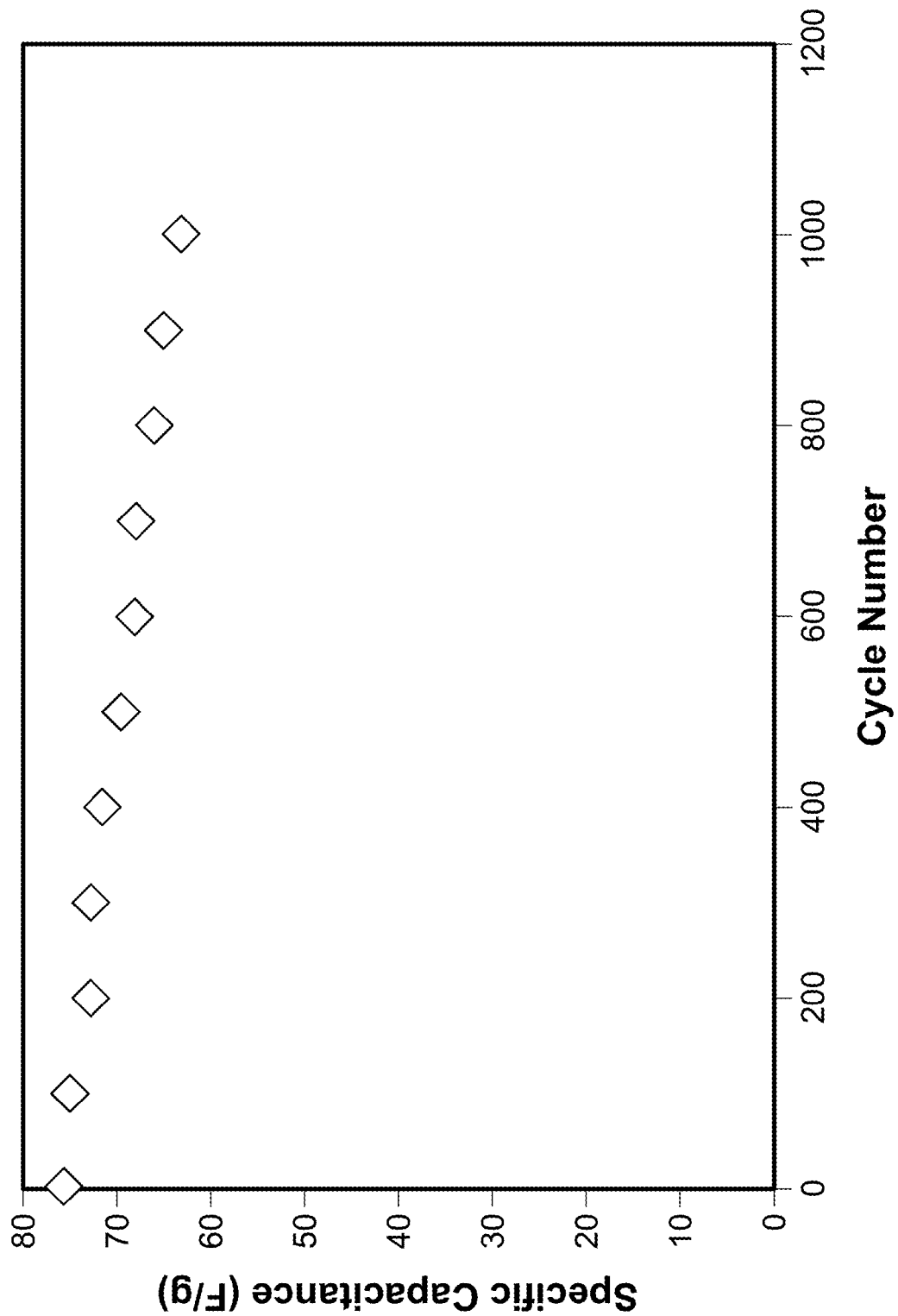
FIG. 6 is a plot of the specific capacitance of the electrode tested to produce the data of FIG. 5 against the number of charge/discharge cycles to which the electrode was subjected.

FIG. 6 is a plot of the specific capacitance of the granule-based capacitor against the number of charge/discharge cycles to which the granule-based capacitor was subjected at 0.1 V/s. The capacitor retained 83% of its initial capacitance after 1000 cycles.

Figure 7:
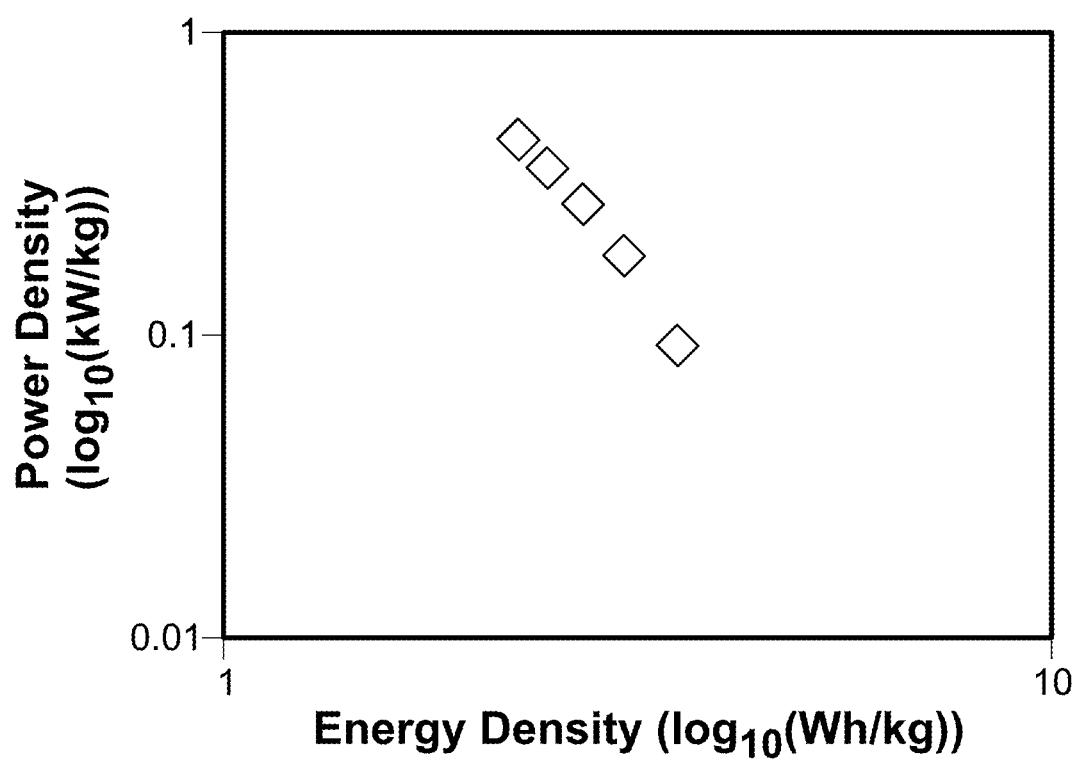
FIG. 7 is a Ragone plot of power density against energy density for the electrode of FIGS. 5 and 6.

FIG. 7 is a Ragone plot of energy density and power density for the granule-based capacitor. Although both the power density and energy density for the granule-based capacitor are lower than for some activated carbon capacitors, the performance of the granule-based electrodes may be optimized through routine modifications to the methods of preparing the granules and the electrode.

The performance of the exemplary granule-based capacitor is within the range of performance which may be achieved with activated carbon capacitor. The electrochemical performance of the graphene oxide capacitor demonstrates the significance of the scalable processing method for preparing graphene oxide granules from graphene oxide according to methods of the present invention. For supercapacitor applications, the power and energy density of the electrodes produced from the graphene oxide granules can be improved upon by further tailoring the factors that affect the three-dimensional morphology of the granules. Such factors which may include the spray drying equipment used, spray-drying process parameters, and the use of structural modifiers in the graphene oxide dispersion.

It will be understood that the embodiments described herein are merely exemplary and that a person skilled in the art may make many variations thereof and modifications thereto without departing from the spirit and scope of the invention. All such variations and modifications are intended to be included within the scope of the invention, which is described in the appended claims.

The invention claimed is:

1. A method of preparing granules having corrugated morphologies, said method comprising the steps of:
    dispersing graphene oxide nanosheets and a structural modifier in an aqueous medium, thereby forming an aqueous dispersion;
    atomizing the dispersion, thereby forming a spray of droplets of the dispersion; and
    drying the droplets of the dispersion, thereby forming granules including a plurality of graphene oxide nanosheets.

2. The method of claim 1, wherein said structural modifier includes ammonium bicarbonate.

3. The method of claim 1, comprising the further step of reducing at least a portion of said plurality of graphene oxide nanosheets to graphene.

4. The method of claim 3, wherein said reducing step includes thermally reducing said at least a portion of said plurality of graphene oxide nanosheets to graphene.

* * * * *